No. 781,541. PATENTED JAN. 31, 1905.
J. F. MEIGS & R. P. STOUT.
GUN CARRIAGE OR MOUNT.
APPLICATION FILED MAR. 6, 1901.

No. 781,541. PATENTED JAN. 31, 1905.
J. F. MEIGS & R. P. STOUT.
GUN CARRIAGE OR MOUNT.
APPLICATION FILED MAR. 6, 1901.

Witnesses:
Jas. E. Hutchinson
J. L. Lawlor

Inventors.
John F. Meigs and Rob't P. Stout, by
Prindle & Russell, their Att'ys

No. 781,541. PATENTED JAN. 31, 1905.
J. F. MEIGS & R. P. STOUT.
GUN CARRIAGE OR MOUNT.
APPLICATION FILED MAR. 6, 1901.

Witnesses:
Jas. E. Hutchinson.
J. L. Lawlor.

Inventors.
John F. Meigs and Robt. P. Stout, by
Brindle and Russell, their Attys.

No. 781,541. PATENTED JAN. 31, 1905.
J. F. MEIGS & R. P. STOUT.
GUN CARRIAGE OR MOUNT.
APPLICATION FILED MAR. 6, 1901.

Witnesses:
Jas. E. Hutchinson.
J. L. Lawlor.

Inventors.
John F. Meigs and Robt. P. Stout, by
Brindle and Russell their Attys.

No. 781,541. Patented January 31, 1905.

UNITED STATES PATENT OFFICE.

JOHN F. MEIGS AND ROBERT P. STOUT, OF SOUTH BETHLEHEM, PENNSYLVANIA, ASSIGNORS TO BETHLEHEM STEEL COMPANY, OF SOUTH BETHLEHEM, PENNSYLVANIA.

GUN CARRIAGE OR MOUNT.

SPECIFICATION forming part of Letters Patent No. 781,541, dated January 31, 1905.

Application filed March 6, 1901. Serial No. 50,111.

*To all whom it may concern:*

Be it known that we, JOHN F. MEIGS and ROBERT P. STOUT, of South Bethlehem, in the county of Northampton, and in the State of Pennsylvania, have invented certain new and useful Improvements in Gun Carriages or Mounts; and we do hereby declare that the following is a full, clear, and exact description thereof, reference being had to the accompanying drawings, in which—

Letters of like name and kind refer to like parts in each of the figures.

The object of our invention is to provide a mount or carriage for guns that will enable the adaptation of the gun for firing to varying conditions, so that, for example, it may be used as a rapid-fire or a disappearing gun; and to this end said invention consists in a gun mount or carriage having the construction substantially as hereinafter specified.

In the carrying of our invention into practice there is employed a turn-table A, upon the upper side of which are two pairs of standards B H and H B, which support each a shaft C, on which is mounted one of a pair of arms or levers D and D, by and between which the gun E is supported and by the swinging of which the gun is moved from and to firing position by the energy developed from recoil. Each of said arms or levers has a segment or arc shaped portion F, to the periphery of which is attached one end of a chain G, the other end of which is secured to a cross-head H, that is connected with the rods of the recoil and counter-recoil mechanisms. One of said rods is a piston-rod I having a piston K in a cylinder L upon the turn-table A, and the others are rods M and M having each a head m, that is engaged by one end of a coiled spring N, that encircles the rod, and whose other end bears against a fixed abutment O on the turn-table. There are preferably, but not necessarily, four rods and springs, and they are grouped around the cylinder L and inclosed in a suitable housing P. Each rod M is tubular or hollow, and within it is a guide or support consisting of a tube p, fixed to one end of the housing P, that restrains any vibratory tendency of the spring.

Figure 1:
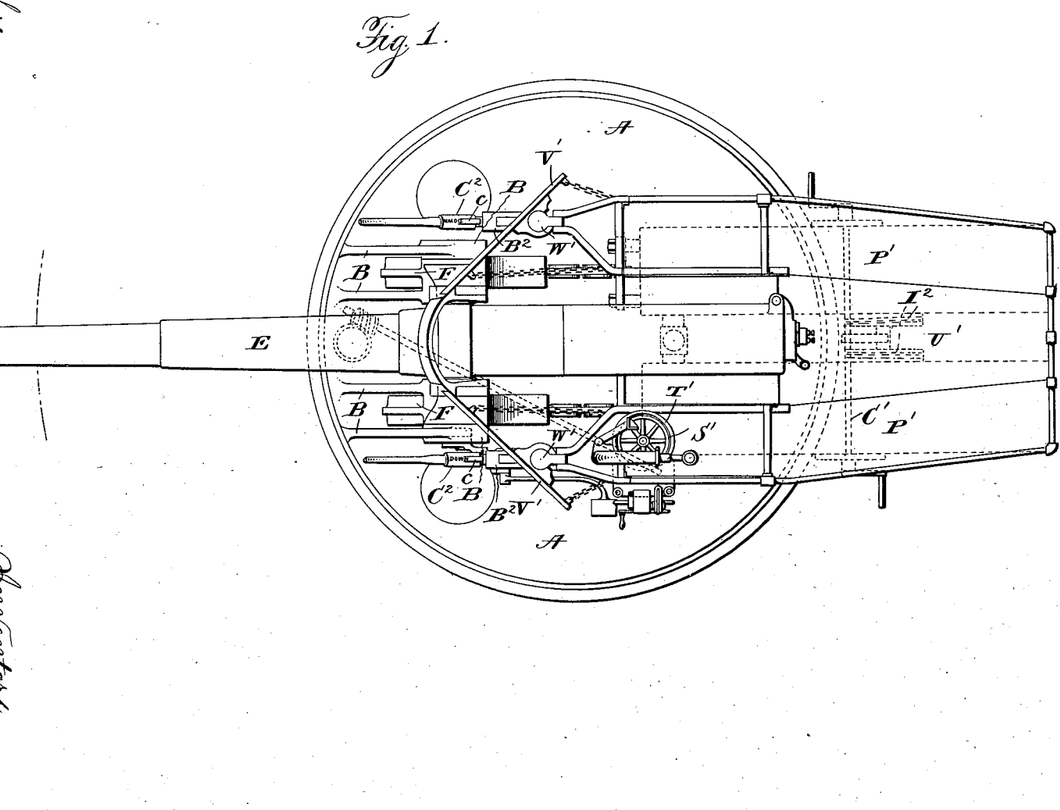
Figure 1 is a top plan view of a gun-carriage embodying our invention.
Figure 2:
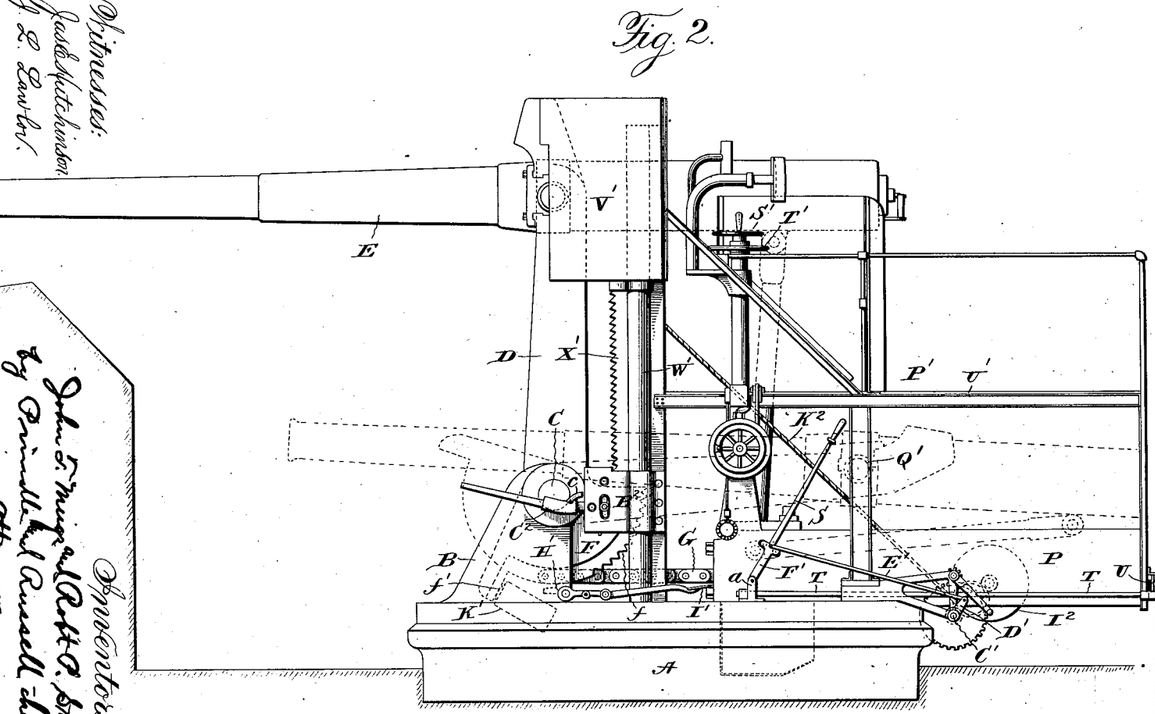
Fig. 2, a side elevation thereof with the gun in its raised position.
Figure 3:
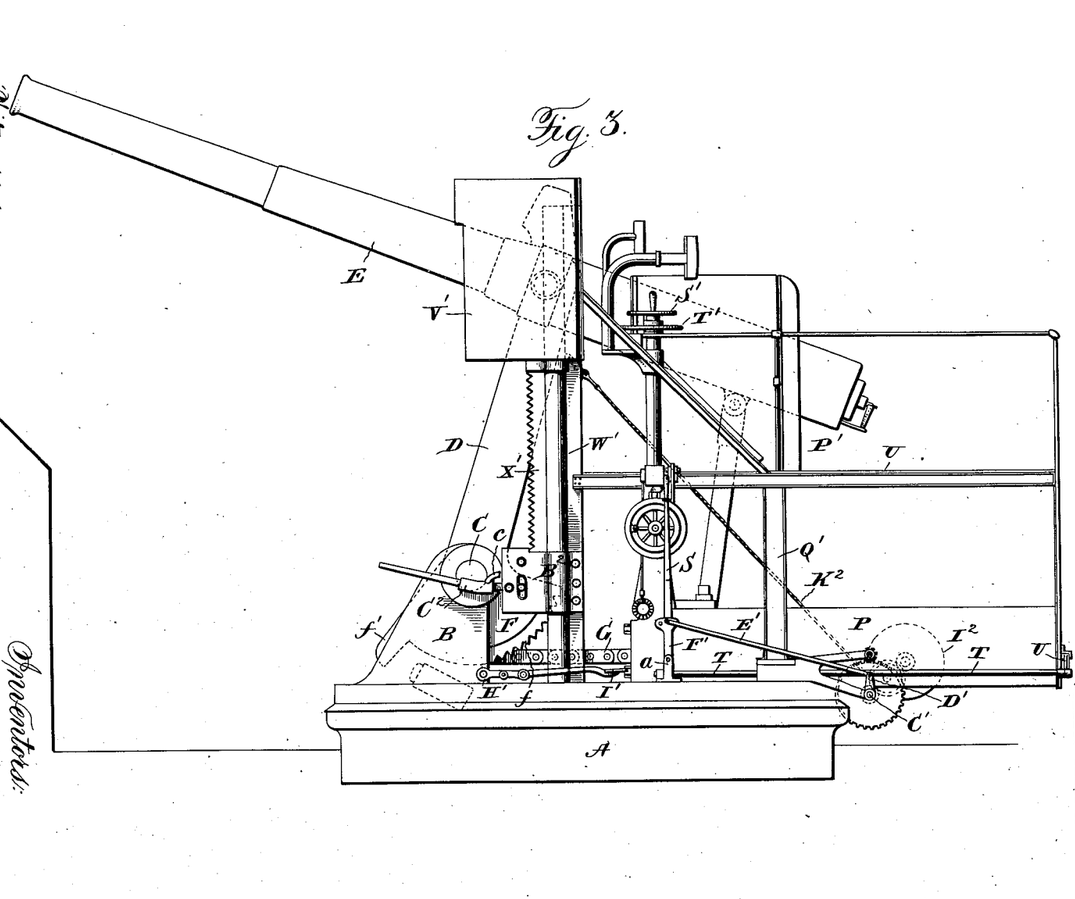
Fig. 3, a like view with the gun elevated for firing at a high angle.
Figure 4:
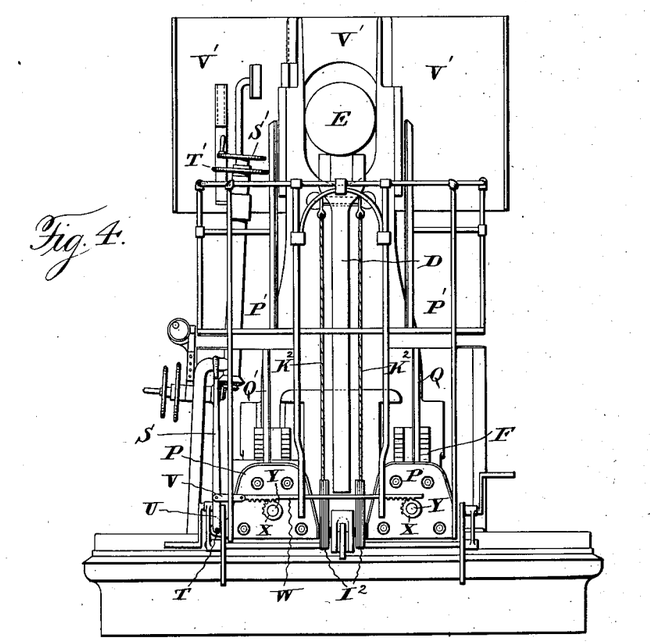
Fig. 4, an end elevation, the parts being in the position shown in Fig. 2.
Figure 5:
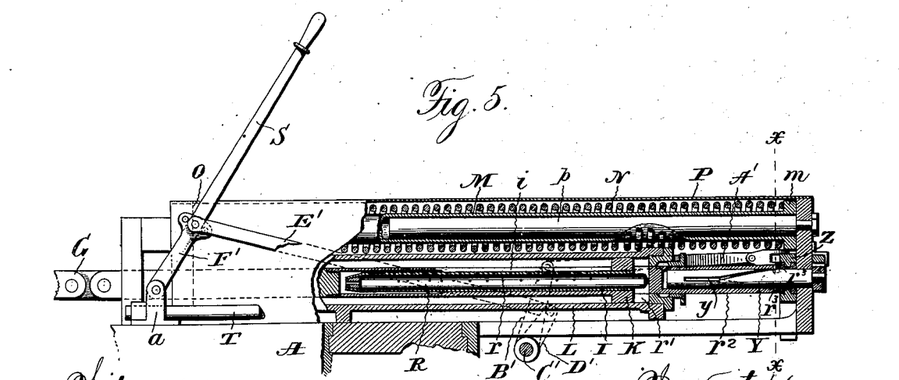
Fig. 5, a view, partly in elevation and partly in section, of the recoil controlling and adjusting mechanism.
Figures 6, 8:
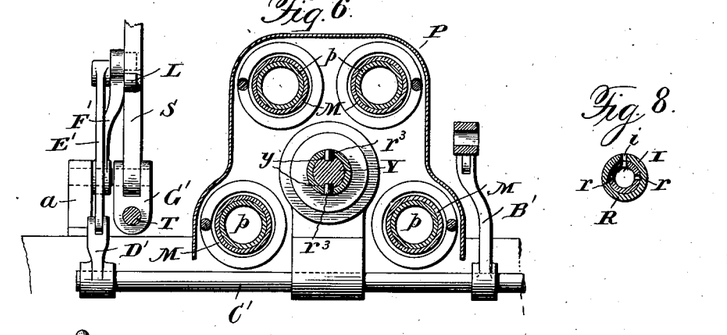
Fig. 6, a detail view in section on the line x x of Fig. 5.
Fig. 8 is a detail view, in cross-section, of the recoil-controlling device.
Figure 7:
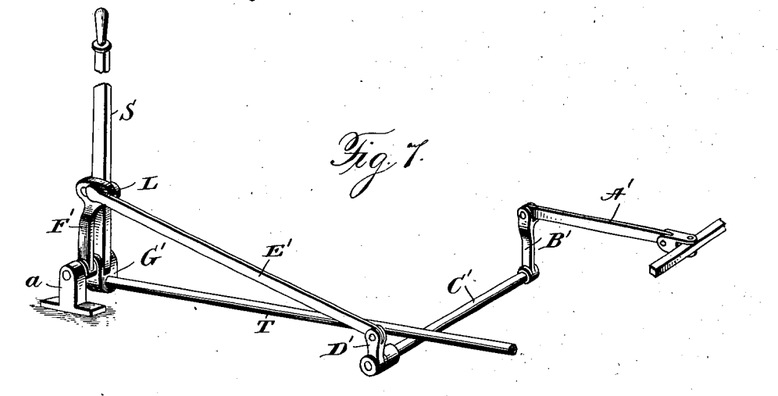
Fig. 7 is a detail view of the lever mechanism for adjusting the recoil-controlling tube.

Recoil is controlled by the passage of liquid from one side of the piston K to another, and we vary it to vary the distance traveled by the gun according to the use to be made of the latter. Thus if the gun is to disappear or travel between firing position above the parapet and loading position down behind the latter the mechanism that controls the passage of fluid is adjusted to permit the amount of movement of the gun required for this purpose. If the gun is not to disappear, but is to be used for rapid fire, such mechanism is adjusted to restrict the travel of the gun under recoil to the shortest distance practicable, and if the gun is to be fired at such a high angle that it is necessary, as shown in Fig. 3, to swing the levers D and D to place the trunnion-bearings in rear of a vertical plane through the lever-shafts C and C to obviate the endwise pressure to which they would be otherwise subjected said mechanism is adjusted to limit the travel of the gun to a distance intermediate the other two.

Any desired form of mechanism may be employed for regulating or controlling the passage of fluid; but we prefer that shown, which consists of a longitudinally-perforated rod or tube R, passing through the piston K and into a chamber in the piston-rod and having several sets of radial passages or perforations $r$ and $r$, any one of which sets by the adjustment of the tube may register with a radial slit or passage $i$ in the wall of the piston-rod, and thus place the interior of the tube R in communication with the cylinder L and through said tube and radial openings $r'$ and $r'$ therein the cylinder-spaces on opposite sides of the piston in communication. As the piston-rod and piston move longitudinally relative to the tube R it will be seen that communication between the cylinder on one side of the piston and the interior of the tube will be gradually and then finally cut off, and as there is a set of perforations for each of the various distances which it is desired to have the gun move under recoil and as the sets are of varying lengths it is apparent that the flow of liquid will be stopped and recoil of the gun arrested at a point determined by the respective set of perforations registering with the slit or passage through the piston-rod wall. A hand-lever S on the turn-table A is connected with the tube R to enable it to be adjusted at will, and such adjustment in the case of two sets of perforations is effected by simple rotation of the tube and in the other case by rotation and longitudinal movement. The lever S has motion in two directions at right angles to each other, in one of which it acts through rack-and-pinion gearing to simply turn the tube and in the other of which it acts through connection with a collar and pin and spiral groove, to both move the tube longitudinally and turn it.

At its lower end the lever S is attached to the forward end of a horizontal rock-shaft T, to whose rear end is fixed a crank-arm U, which is connected by a link V to a rack-bar W, having teeth on its under side that mesh with the teeth of a mutilated pinion X on the rear end of a shaft Y, that extends into a rearward extension $r^2$ of the tube R. Diametrically opposite each other in the shaft Y are two spiral grooves $y$ and $y$, which respectively engage studs or pins $r^3$ and $r^3$, attached to the tube extension $r^2$, and having a swiveled connection with the rear end of the tube extension is a head or follower Z. Said head or follower is connected by a link A' with a crank-arm B', attached to a horizontal rock-shaft C', having a crank-arm D', that is connected by a link E' with a lever F', pivoted at the lower end to a bracket $a$ on the turn-table A, the pivoted portion of said lever F' being laterally in line with the lower end of the hand-lever S, so that the latter when moved laterally, as it may do by reason of its connection with the rock-shaft T, will move to and from said lever F'. The latter on its side toward the hand-lever S has two studs L' and L', between which the hand-lever S may be placed when it is moved toward the lever F', so as to cause the latter and the parts above described as connected with it to be moved back and forward. To enable the lever S to swing backward and forward or in a line in the direction of the axis of the rock-shaft T, the connection between the lever and the rock-shaft consists of a block G', fastened to the rock-shaft, to which block the lever S is pivoted. It will be seen that when the hand-lever S is moved laterally it will turn the rock-shaft T and through the rack-and-pinion connection between it and the shaft Y will turn the latter and through the groove-and-pin connection between said shaft Y and the tube extension $r^2$ will turn the tube. With the hand-lever in position between the studs on the lever F' swinging of the hand-lever in a direction parallel with the axis of the tube R will, through the connection between said lever T and the head or follower Z, move the tube R longitudinally and at the same time cause its revolution by the passage of the studs or pins $r^3$ and $r^3$ along the spiral grooves $y$ and $y$, no rotation of the shaft Y occurring during this movement of the parts. The adjustment secured by shifting the tube R longitudinally is for firing the gun at a high angle. As it is necessary, as heretofore explained, when the gun is to be fired at a high angle to swing the levers D and D rearward, the piston K is accordingly moved forward.

When the gun is used for rapid fire, counter-recoil ensues as soon as recoil is completed; but when it is used as a disappearing gun it is locked in its depressed position for loading, such locking being done by means of ratchet-teeth $f$ on the segments of the levers D and D and a pawl H' for each set of teeth pivoted to the turn-table A and connected with a treadle I' for effecting the disengagement of pawls and ratchets when the gun is to be returned to firing position.

Figure 9:
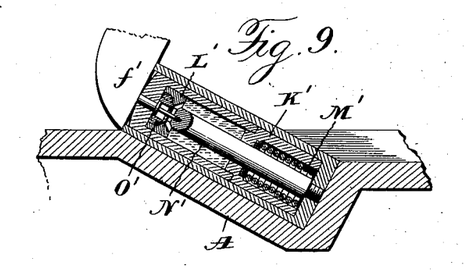
Fig. 9, a detail view, in longitudinal section, of the cushioned stop.

As the gun in moving to firing position can pass to a point which carries the trunnion-bearings of the levers D and D forward of the vertical plane through the axis of the lever-shafts, it will be evident that because of the flexible chain connection between said levers and the recoil mechanism the gun will fall forward as soon as its trunnion-axis passes forward of said vertical plane. To arrest such forward fall there is provided, preferably for coöperation with each lever, a cushion stop or buffer that comprises a hollow plunger or cylinder K', movable longitudinally in a guide or casing on the turn-table A, a piston L', therein, and a coiled spring M', that presses the cylinder outward from said casing in the path of a radial lug or arm $f'$ on the lever-segment F. The piston L' is on a fixed piston-rod N', and through the piston are several passages controlled by a perforated valve O'. The cylinder contains a suitable fluid, which when the cylinder is projected outward by the spring is between its outer end and the piston L' and by the inward movement of the cylinder under the blow of the lug is passed to the opposite side of the piston, controlling the inward movement of the cylinder. On the lifting of the lug from the cylinder the latter is quickly projected outward by the action of the spring, the fluid on the inner side of the piston being promptly passed to the other side thereof by the ample opening afforded on the raising of the valve O', so that the buffer is again in readiness to act. Other means for controlling the flow of fluid can of course be substituted for that described.

Figure 12:
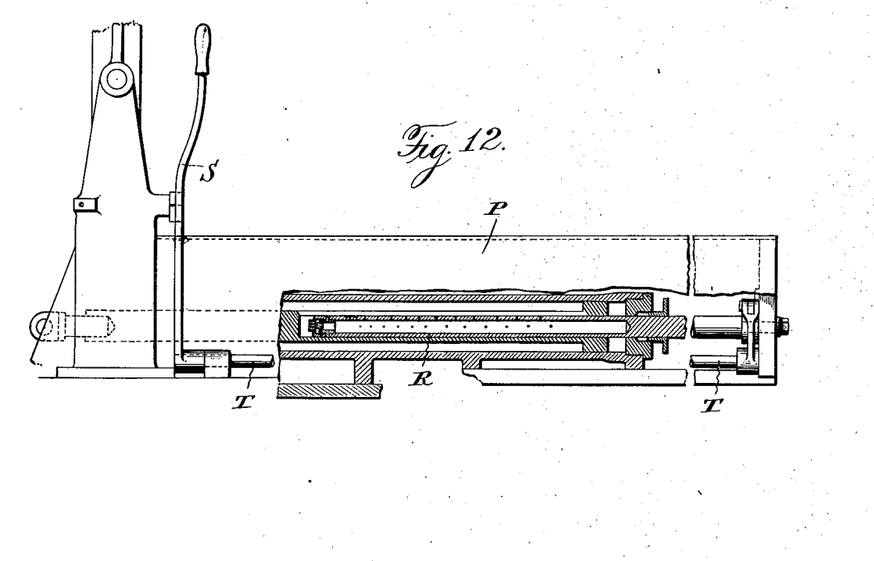
Fig. 12, a side view, partly in elevation and partly in section, of a recoil-controlling mechanism having adjustment for two positions.
Figure 13:
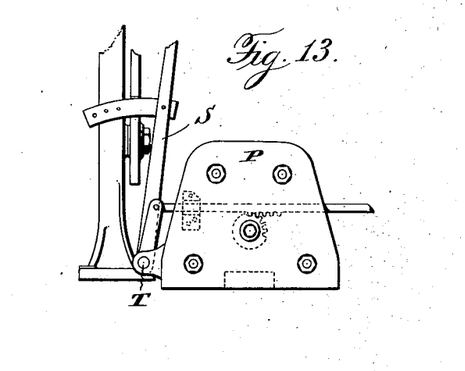
Fig. 13, an end elevation of the same.

When, as may be desirable in some cases, only two adjustments of the recoil-controlling mechanism are necessary, the construction and arrangement of parts illustrated in Figs. 12 and 13 may be employed, wherein provision is made for merely rotating the tubes R and R and not moving them longitudinally. In this case a simple lever S is employed, that is mounted on the shaft T and by its movement in one direction or the other rotates the recoil-controlling tubes according to the extent of movement of the gun desired.

To permit elevating and training of the gun at a higher level than the turn-table, a platform P' is provided, that is supported on posts Q' and Q', rising from the turn-table, and to which shafts from the elevating and training mechanisms are extended and provided thereat with hand-wheels S' and T' or other operating means. As said mechanisms are not claimed herein, no description thereof is given. The platform P' is extended on each side of the gun, an opening being left for the passage of the gun when it is moved by recoil below the platform. When the gun does not move so far, but is restricted to movement above the platform, as in rapid fire, said opening is covered to provide a standing-place by a metal plate U', which will bend and be dislodged by the gun without damage to the platform should said plate be left in place when the recoil mechanism is adjusted to permit movement of the gun to a position below the platform.

Figure 10:
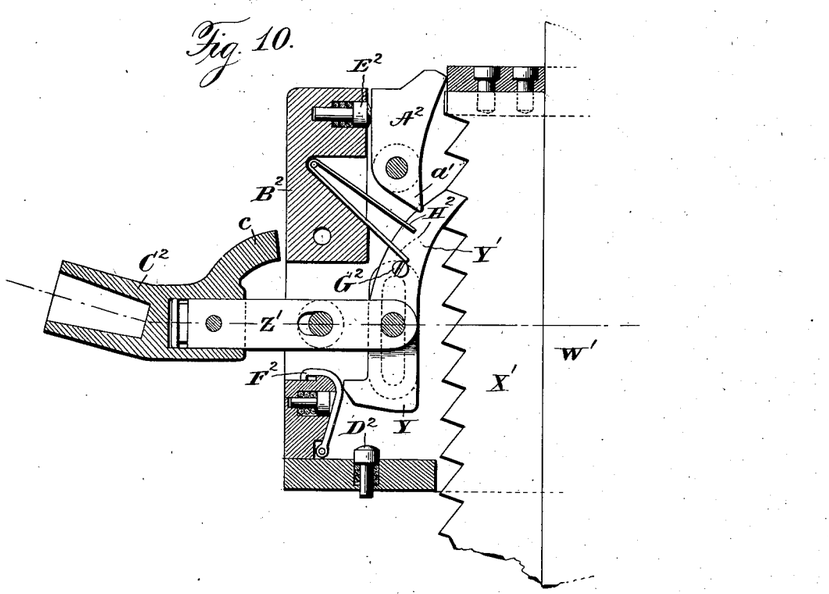
Fig. 10, a detail view, in vertical section, of the shield-operating mechanism.
Figure 11:
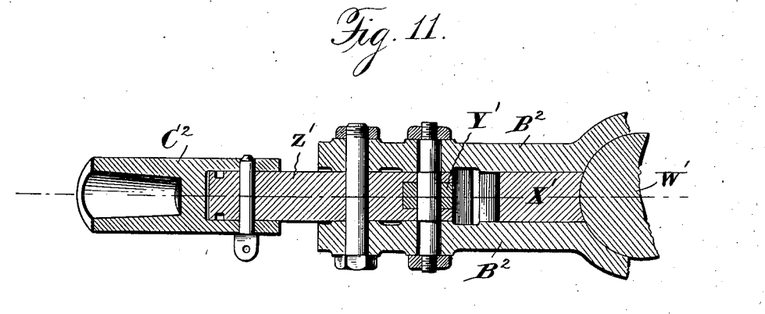
Fig. 11, a horizontal section of the same.

A shield V' is provided in front of the platform P', and as it may be desirable to lower it behind the parapet it is mounted so that it may be lowered and raised. To this end said shield is slidably mounted on two uprights or posts W' and W', respectively, on opposite sides of the gun, and for raising and lowering it two vertical rack-bars X' and X' are attached to it, that respectively extend alongside of the two posts and with each of which coöperates a pawl Y', that is operated by a lever Z' and a catch or detent-pawl $A^2$, the latter and said lever being pivoted to a frame $B^2$, secured to the respective post. The lever Z' has a removable handle $C^2$, which may be reversed according as the shield is to be raised or lowered, and upon its upper and lower sides, respectively, are the words "Up" and "Down" or other signs to indicate the direction of movement given the shield in view of the position of the handle. When it is desired to lift the shield, the rocking of the lever by the handle moves the pawl Y' up and down, it engaging a rack-tooth during its upward movement, and thereby raising the shield and moving to position for engagement with the next lower tooth when it moves downward, the shield during the descent of the pawl being held by the detent-pawl $A^2$. The pawl Y' on completing its descent is thrown into engagement with a rack-tooth by a spring-pressed plunger $D^2$, against which the lower end of said pawl strikes. A similar spring-pressed plunger $E^2$ yieldingly moves the detent-pawl $A^2$ into engagement with the rack-teeth. When it is desired to lower the shield, the position of each of the lever-handles is reversed and the pawl Y' is movable higher than with the handle in the former position, but not so low. When at its lower limit of motion, the lower end of the pawl is engaged by a pivoted spring-pressed plate $F^2$ and the upper end of the pawl thereby freed from and kept out of engagement with the rack, so that on its ascent the pawl may rise without contact with the rack. Carried by the pawl Y' is a pin $G^2$, which as the pawl nears its upper limit of motion strikes one leg of a V-shaped spring $H^2$ free to rock a limited extent and which by the continued ascent of the pin with the pawl is moved to place its other leg against a toe $a'$ on the detent-pawl $A^2$. The upward movement of the pawl Y' continuing, its upper end engages the hub of the detent-pawl and is thereby moved into engagement with the rack, and slightly lifting the latter and the shield and taking the weight off of and freeing the detent-pawl $A^2$ the latter is quickly moved out of engagement with the rack by the spring $H^2$, which has been placed under a tension superior to the pressure on the plunger $E^2$. The detent-pawl being thus freed from the rack, the shield is supported wholly by the pawls Y' and Y' and on lowering the latter will descend until the spring $H^2$ being freed from tension the spring-pressed plunger $E^2$ is able to act and reëngage the detent-pawl with a tooth of the rack. This operation being repeated, the shield will be lowered by a step-by-step motion. The limited vertical motion of the pawls Y' and Y' in each of the operations of raising and lowering the shield is secured by means of an arm or extension $c$ on each of the pawl-operating handles which strikes against the frame $B^2$.

For lowering the gun behind the parapet by hand a windlass $I^2$ is provided, from the drum of which two ropes or cables $K^2$ and $K^2$ run and are connected to the gun-supporting levers D and D.

Having thus described our invention, what we claim is—

1. The combination of a gun mounted to disappear, a recoil-controlling mechanism, and means operating on said mechanism whereby, at will, it may be used as a disappearing or non-disappearing gun, substantially as and for the purpose described.

2. The combination of a gun mounted to disappear, a recoil-controlling mechanism, and means whereby the latter may be adjusted to prevent the gun from disappearing, substantially as and for the purpose described.

3. The combination of a gun, an adjustable recoil-controlling mechanism, and means to adjust the latter to stop the movement of the gun at any one of a plurality of positions, substantially as and for the purpose described.

4. The combination of a gun, an adjustable recoil-controlling mechanism adapted to be adjusted to check the movement of the gun at various positions and a lever for adjusting said mechanism movable to any one of a plurality of predetermined positions, substantially as and for the purpose described.

5. The combination of a swinging gun-support, an adjustable recoil-controlling mechanism connected with said support, and means for fixing the movement of the gun from recoil to any one of a plurality of predetermined positions, substantially as described.

6. The combination of a movable gun-support, a recoil-controlling mechanism, comprising a piston and cylinder, and means for varying relative movement of the latter two to predetermined extents to change the stopping-points of the support, substantially as described.

7. The combination of a swinging gun-support movable by recoil from a higher to a lower position, an adjustable recoil-controlling mechanism, and means to adjust said mechanism to limit the movement of the gun-support to less than the distance between the higher and lower positions of the gun, substantially as described.

8. In a recoil mechanism, the combination of a cylinder, a piston, a hollow piston-rod having a perforated wall, and a tube passing through said piston and into the piston-rod, and having a perforated wall, substantially as and for the purpose described.

9. In a recoil mechanism, the combination of a cylinder, a piston, means for the passage of fluid from one side of the piston to the other, a fluid-regulating device shiftable rotatably and longitudinally to vary the relative movement of piston and cylinder, and means to shift it to predetermined positions, substantially as and for the purpose described.

10. In a recoil mechanism, the combination of a cylinder, a piston, means for the passage of fluid from one side of the piston to the other, a fluid-regulating device comprising two perforated longitudinally-movable parts, one of which has several openings adapted to successively coact with the perforation of the other part, and means whereby, at will, one part may be shifted rotatably relative to the other part and shifted longitudinally.

11. In a recoil mechanism, the combination of a cylinder, a piston, a perforated chambered part in communication with the cylinder on one side of the piston, and a part within the latter, in communication with the cylinder on the other side of the piston, and having several openings adapted to successively coact with the perforation of the other part, said openings being of varying extent, whereby the gun may be stopped in predetermined positions, substantially as described.

12. In a recoil mechanism, the combination of a cylinder, a piston, a perforated chambered part in communication with the cylinder on one side of the piston, and a second perforated chambered part having perforations of varying extent within the other, and in communication with the cylinder on the other side of the piston, one of said chambered parts being rotatable relative to the other to change the relative position of their perforations whereby the gun may be stopped in predetermined positions, substantially as described.

13. In a recoil mechanism, the combination of a cylinder, a piston, a fluid-controlling mechanism, comprising a longitudinally-movable perforated member, means for moving said member longitudinally at will, and a second longitudinally-movable perforated coacting member.

14. In a recoil mechanism, the combination of a cylinder, a piston, a tubular, perforated longitudinally-movable piston-rod, and a longitudinally-movable, perforated tube in the piston-rod, substantially as described.

15. The combination of a gun mounted for firing either as a disappearing or as a non-disappearing gun, and a shield shiftable into and out of position for use, substantially as described.

16. The combination of a gun mounted for firing either as a disappearing or as a non-disappearing gun, a shield, means for supporting it in an elevated position, and means for raising and lowering it, substantially as described.

17. The combination of a gun, an adjustable recoil-controlling mechanism, means whereby the latter may be adjusted to prevent the gun from disappearing, and a shield shiftable into and out of position for use.

18. The combination of a gun, an adjustable recoil-controlling mechanism, means whereby the latter may be adjusted to prevent the gun from disappearing, a shield, means for supporting it in an elevated position, and means for raising and lowering it.

In testimony that we claim the foregoing we have hereunto set our hands this 4th day of January, A. D. 1901.

JOHN F. MEIGS.
ROBERT P. STOUT.

Witnesses:
JAMES KERNAN,
C. O. BRUNNER.